(12) United States Patent
Chien et al.

(10) Patent No.: US 6,694,569 B2
(45) Date of Patent: Feb. 24, 2004

(54) HINGE DEVICE

(75) Inventors: Chung-Chi Chien, Taipei (TW); Wu-Yung Chen, Taipei (TW)

(73) Assignee: Compal Electronics, Inc. (TW)

( * ) Notice: Subject to any disclaimer, the term of this patent is extended or adjusted under 35 U.S.C. 154(b) by 0 days.

(21) Appl. No.: 10/093,473

(22) Filed: Mar. 11, 2002

(65) Prior Publication Data

US 2003/0167600 A1 Sep. 11, 2003

(51) Int. Cl.[7] .............................. E05D 3/06; E05D 3/10; H05K 7/16
(52) U.S. Cl. .............................. 16/367; 16/366; 16/324; 361/681
(58) Field of Search .......................... 16/324, 321, 326, 16/367, 365, 366; 361/683, 680–682; 248/919–920

(56) References Cited

U.S. PATENT DOCUMENTS

| | | | | |
|---|---|---|---|---|
| 817,220 A | * | 4/1906 | Caley ........................... | 16/324 |
| 924,412 A | * | 6/1909 | Anderson ..................... | 16/324 |
| 1,206,824 A | * | 12/1916 | Dyer .............................. | 49/44 |
| 5,016,849 A | * | 5/1991 | Wu .......................... | 248/176.3 |
| 5,168,423 A | * | 12/1992 | Ohgami et al. ............. | 361/681 |
| 5,206,790 A | * | 4/1993 | Thomas et al. ............. | 361/681 |
| 5,335,142 A | * | 8/1994 | Anderson ..................... | 361/681 |
| 6,275,376 B1 | * | 8/2001 | Moon .......................... | 361/683 |
| 6,397,433 B1 | * | 6/2002 | Chen ........................... | 16/327 |
| 6,517,129 B1 | * | 2/2003 | Chien et al. ............. | 292/251.5 |

FOREIGN PATENT DOCUMENTS

DE           3538727 A1 * 5/1987 ............. E05F/1/12

* cited by examiner

*Primary Examiner*—Anthony Knight
*Assistant Examiner*—Michael J. Kyle
(74) *Attorney, Agent, or Firm*—Bacon & Thomas, PLLC (57) ABSTRACT

A hinge device. The device includes an elongated main frame that extends along a first axis. The device includes an elongated pivot rod that extends along the first axis and that has a pivot end portion coupled pivotally to a stationary fixing block such that the pivot rod is rotatable axially about the first axis, and a connecting end portion connected to the main frame. A pivot unit includes an elongated pivot shaft that extends along a second axis transverse to the first axis. The pivot shaft has an upper end portion opposite to a lower end portion, which is coupled to the main frame, and projecting from the main frame. A pivot member is coupled pivotally to the upper end portion of the pivot shaft. A positioning unit is mounted on the main frame and is operable so as to prevent axial rotation of the pivot member about the second axis.

8 Claims, 8 Drawing Sheets

//HINGE DEVICE

BACKGROUND OF THE INVENTION

1. Field of the Invention

The invention relates to a hinge device, more particularly to a hinge device that can pivot axially about first and second axes.

2. Description of the Related Art

Figure 1:
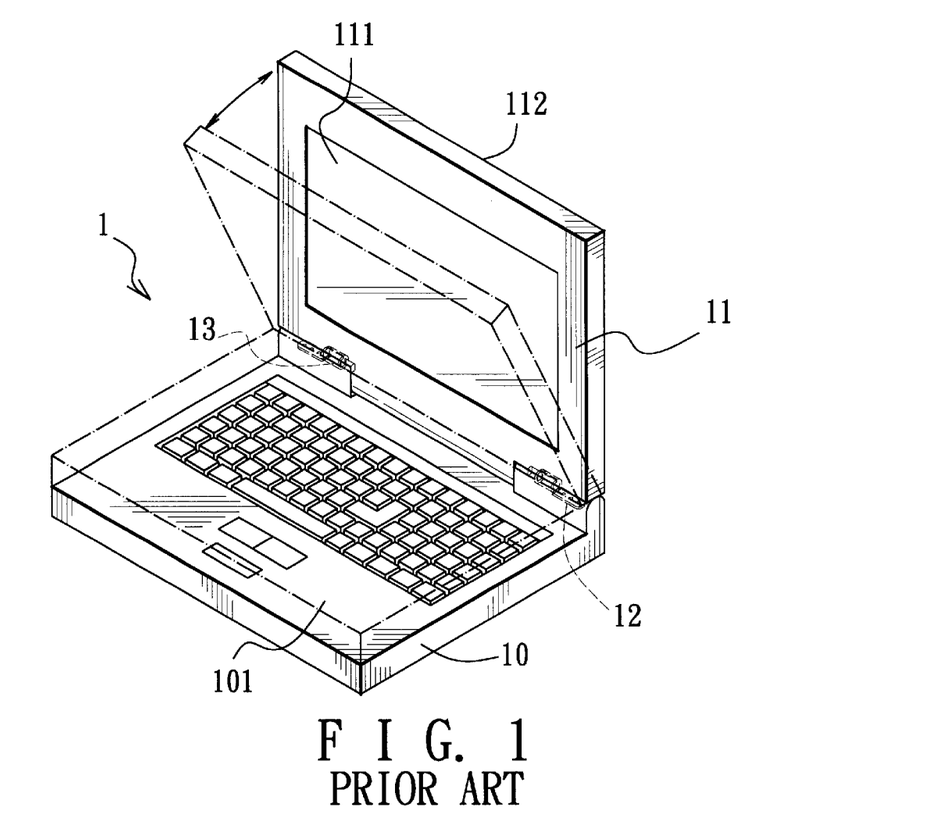
FIG. 1 is a perspective view showing a notebook computer with a conventional hinge device.
Figure 2:
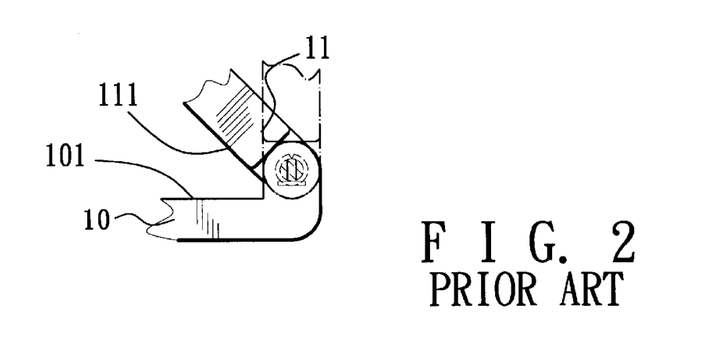
FIG. 2 is a fragmentary schematic side view showing how a display panel of the notebook computer is rotated relative to a main computer housing thereof.

FIG. 1 illustrates a notebook computer 1 that includes a main computer housing 10, a display panel 11, and a pair of conventional hinge devices 13 for interconnecting pivotally the main computer housing 10 and the display panel 11. Each of the conventional hinge devices 13 includes a fixing end portions mounted on the main computer housing 10, and a pivot end portion connected pivotally to the display panel 11 such that the display panel 11 is rotatable relative to the main computer housing 10 so as to enable an inner surface 111 of the display panel 11 to move toward or away from a top surface 101 of the main computer housing 10 (see FIG. 2). However, the inner surface 111 of the display panel 11 cannot be rotated to face rearwardly and upwardly of the main computer housing 10.

SUMMARY OF THE INVENTION

Therefore, the object of the present invention is to provide a hinge device that can pivot axially about first and second axes.

According to the present invention, a hinge device comprises:

an elongated main frame extending along a first axis, and having a first end portion and a second end portion opposite to the first end portion along the first axis;

a hinge unit including a stationary fixing block, and an elongated pivot rod that extends along the first axis and that has a pivot end portion coupled pivotally to the stationary fixing block such that the pivot rod is rotatable axially about the first axis, and a connecting end portion connected to the first end portion of the elongated main frame such that the elongated main frame is co-rotatable with the pivot rod relative to the stationary fixing block;

a pivot unit including an elongated pivot shaft that extends along a second axis transverse to the first axis, the pivot shaft having a lower end portion coupled to the elongated main frame, and an upper end portion opposite to the lower end portion and projecting from the elongated main frame, the pivot unit further having a pivot member coupled pivotally to the upper end portion of the pivot shaft such that the pivot member is capable of rotating axially relative to the elongated main frame about the second axis; and a positioning unit mounted on the elongated main frame and operable so as to prevent axial rotation of the pivot member about the second axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
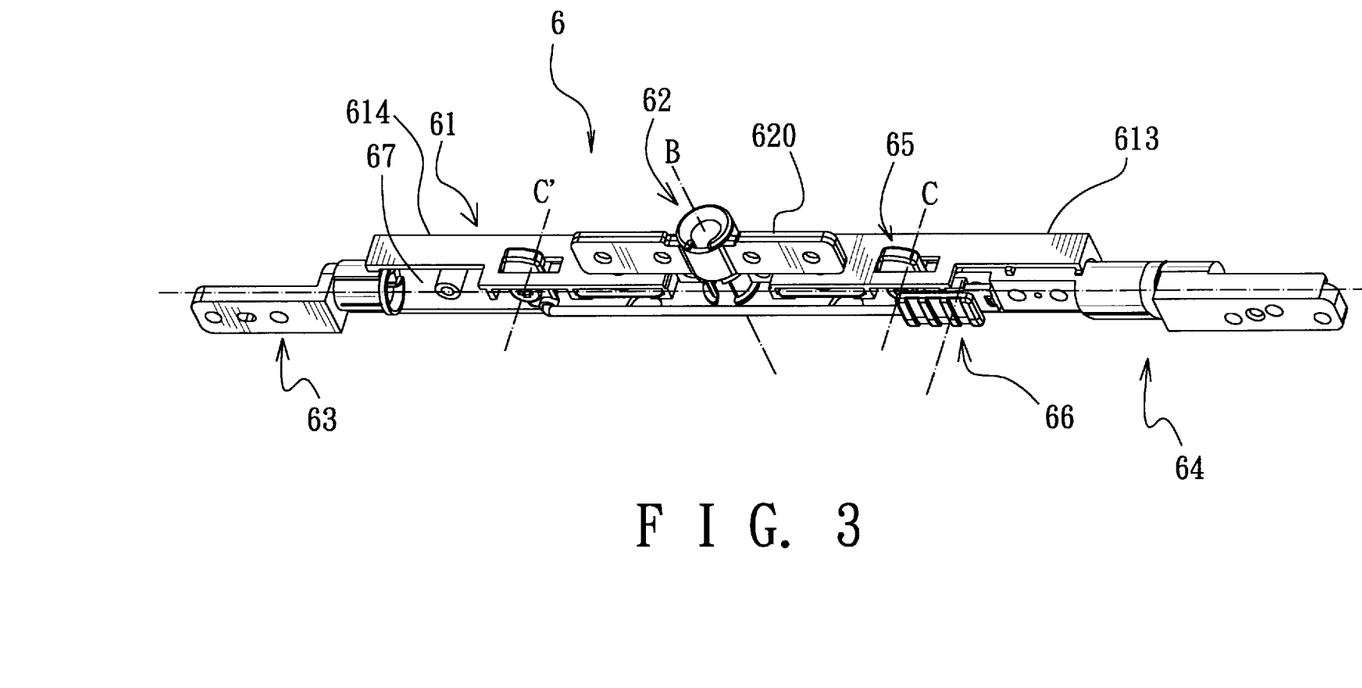
FIG. 3 is a fragmentary perspective view showing the preferred embodiment of a hinge device according to the present invention.
Figure 4:
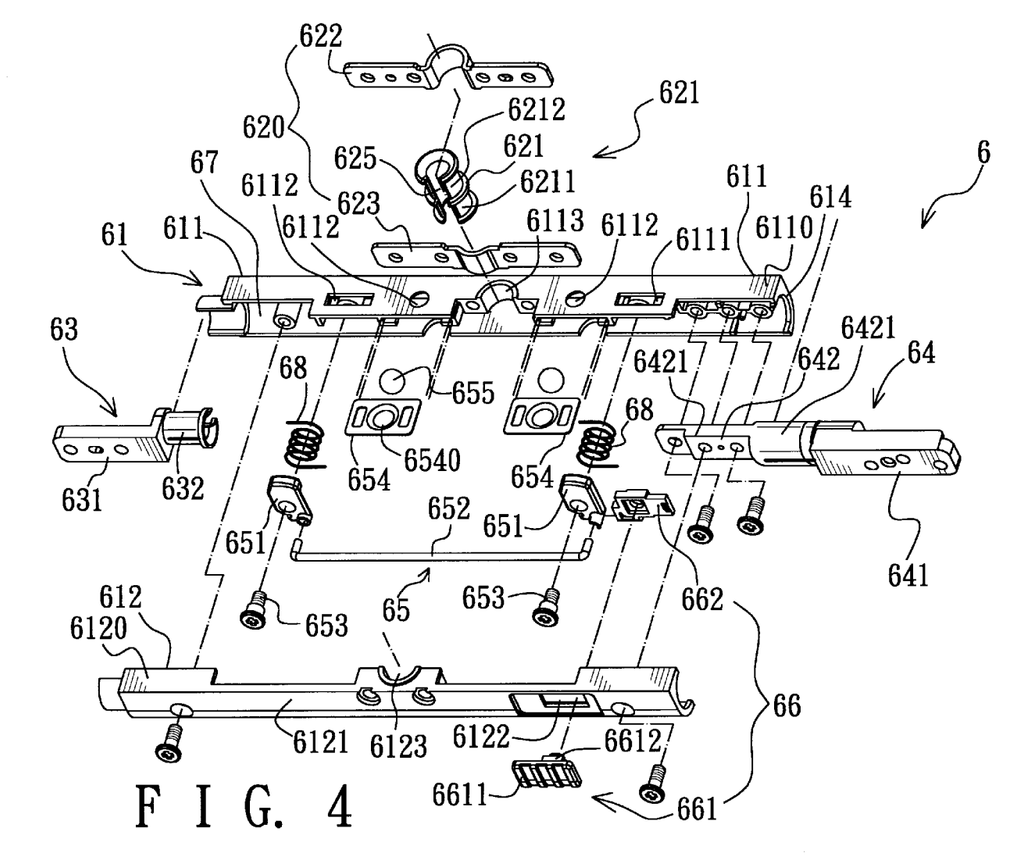
FIG. 4 is an exploded perspective view showing the preferred embodiment.
Figure 5:
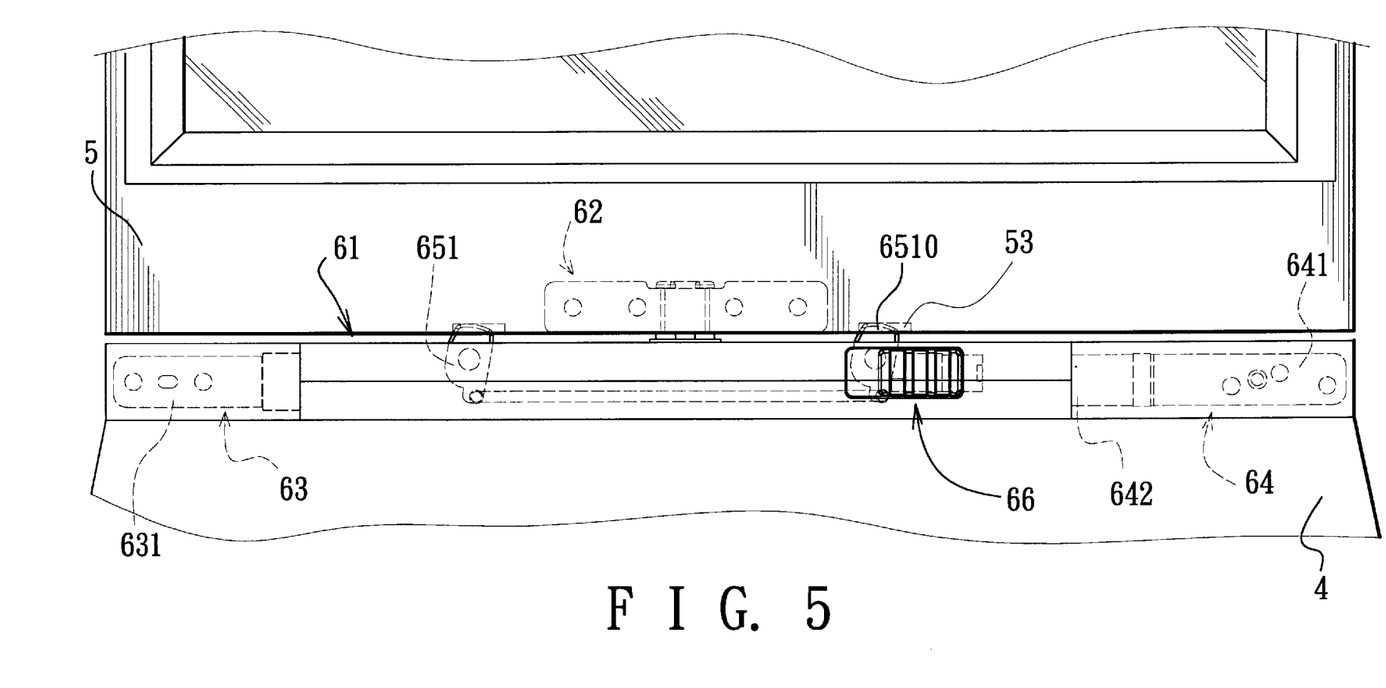
FIG. 5 is a fragmentary schematic front view showing the preferred embodiment when assembled on a notebook computer and when a pair of positioning blocks of the preferred embodiment are disposed at a first position.

Referring to FIGS. 3 and 4, the preferred embodiment of a hinge device 6 according to the present invention is shown to include an elongated main frame 61, a hinge unit 64, a pivot unit 62, a positioning unit 65, and an operating unit 66. In this embodiment, the hinge device 6 is adapted to be used for interconnecting pivotally a main computer housing 4 and a display panel 5 of a notebook computer 5, as shown in FIG. 5.

The elongated main frame 61 extends along a first axis (A), and has a first end portion 613 and a second end portion 614 opposite to the first end portion 613 along the first axis (A). In this embodiment, the elongated main frame 61 includes a first frame member 611 and a second frame member 612 that cooperates with the first frame member 611 to confine an inner receiving space 67 that extends along the first axis (A). The first frame member 611 has a top wall 6110 formed with a first recess 6113 and a pair of positioning holes 6111. The second frame member 612 has a top wall 6120 formed with a second recess 6123, and a front wall 6121 formed with an operating hole 6122. The first recess 6113 cooperates with the second recess 6123 so as to confine a shaft-receiving hole.

The hinge unit 63 includes a stationary fixed block 641 that is adapted to be mounted in the main computer housing 4 (see FIG. 5), and an elongated pivot rod 642 that extends along the first axis (A) and that has a pivot end portion 6421 coupled pivotally to the stationary fixing block 641 such that the pivot rod 642 is rotatable axially about the first axis (A), and a connecting end portion 6422 that is connected to the first end portion 613 of the elongated main frame 61 by means of a pair of screw fasteners such that the elongated main frame 61 is co-rotatable with the pivot rod 642 relative to the stationary fixing block 641. In this embodiment, the connecting end portion 6422 of the pivot rod 642 extends into the inner receiving space 67 at the first end portion 613 of the elongated main frame 61.

The pivot unit 62 includes an elongated pivot shaft 621 that extends along a second axis (B) transverse to the first axis (A). The pivot shaft 621 has a lower end portion 6211 coupled to the elongated main frame 61 and extending into the inner receiving space 67 via the shaft-receiving hole in the first frame member 611 of the elongated main frame 61, and an upper end portion 6212 opposite to the lower end portion 6211 and projecting from the elongated main frame 61. The pivot unit 62 further has a pivot member 620, which is adapted to be mounted in the display panel 5 (see FIG. 5) and which consists of first and second pivot plates 622, 623, coupled pivotally to the upper end portion 6212 of the pivot shaft 621 such that the pivot member 620 is capable of rotating axially relative to the elongated main frame 61 about the second axis (B).

Figure 6:
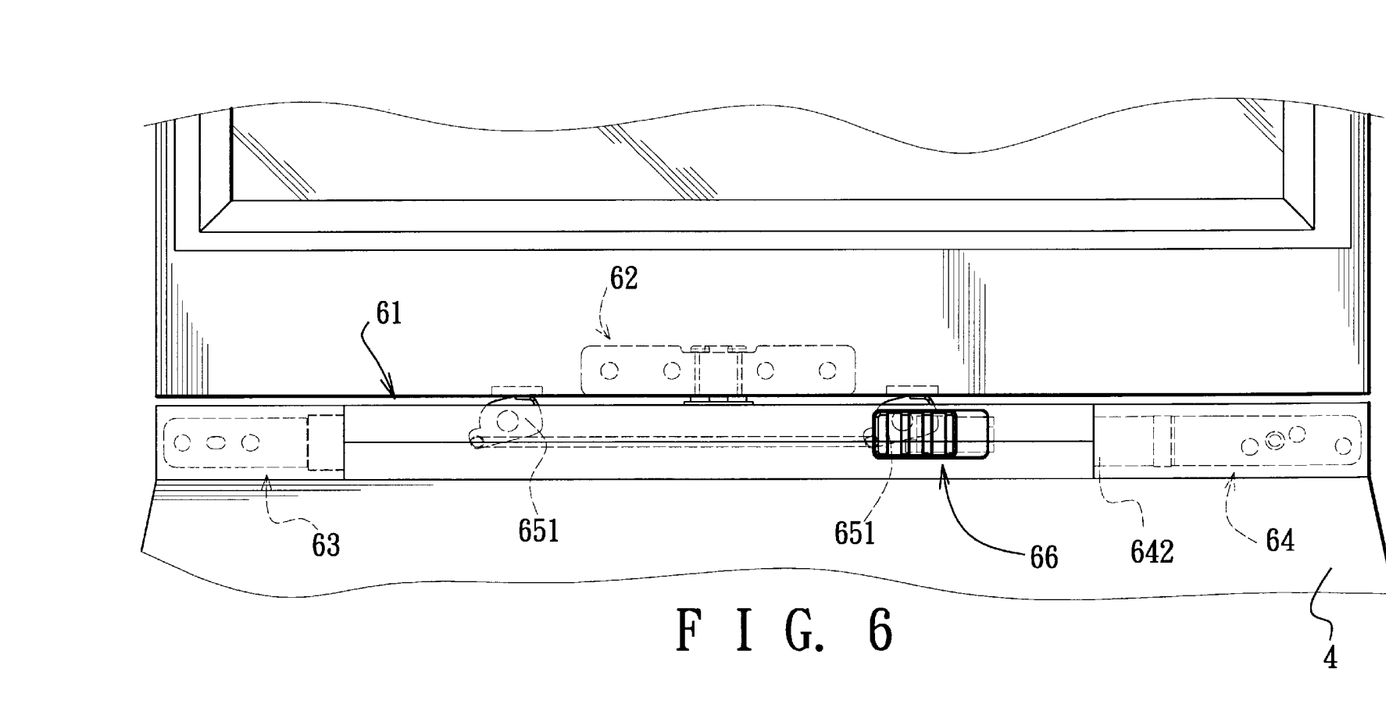
FIG. 6 is a fragmentary schematic front view showing the preferred embodiment when the positioning blocks are disposed at a second position.

The positioning unit 65 is mounted on the elongated main frame 61, and is operable so as to prevent axial rotation of the pivot member 620. The positioning unit 65 includes a pair of positioning blocks 651 and a connecting rod 652. Each of the positioning blocks 651 is mounted pivotally in the inner receiving space 67 by means of a bolt 653 extending therethrough and fastened to the first frame member 611, is registered with a respective one of the positioning holes 6111 in the top wall 6110 of the first frame member 611, and is rotatable about a respective third axis (C, C') transverse to the first and second axes (A, B). The positioning blocks 651 are rotatable between a first position, wherein the positioning blocks 651 project upwardly from the first frame member 611 via the positioning holes 6111 (see FIG. 5), and a second position, wherein the positioning blocks 651 are fully concealed within the inner receiving space 67 (see FIG. 6). In this embodiment, when the positioning blocks 651 are disposed at the first position, top ends 6510 of the positioning blocks 651 are adapted to extend into and engage a pair of engaging grooves 53 formed in the display panel 5, as shown in FIG. 5. The connecting rod 652 interconnects the positioning blocks 651 to ensure simultaneous rotation of the positioning blocks 651. In this embodiment, the top wall 6110 of the first frame member 611 is further formed with a pair of ball holes 6112. The positioning unit 65 further includes a pair of resilient plates 654 and a pair of positioning balls 655. Each of the resilient plates 654 is mounted in the inner receiving space 67 below the top wall 6110 of the first frame member, and is formed with a recess 6540 that is aligned with a respective one of the ball holes 6112. Each of the positioning balls 655 is disposed in a respective one of the recesses 6540 between the top wall 6110 of the first frame member 611 and a respective one of the resilient plates 654. The positioning balls 655 protrude outwardly of the inner receiving space 67 via the ball holes 6112 in the top wall 6110 of the first frame member 611, respectively. It is noted that the hinge device 6 further includes a biasing unit for biasing the positioning blocks 651 to the first position. In this embodiment, the biasing unit includes a pair of torsion springs 68 mounted in the inner receiving space 67. Each of the torsion springs 68 is sleeved on a respective bolt 653 and engages a respective one of the positioning blocks 651 and a rear wall 6114 of the first frame member 611.

The operating unit 66 includes an operating member 661 and an abutting block 662. The operating member 661 has an operating portion 6611 mounted on the front wall 6121 of the second frame member 612 and movable along the first axis (A), and a connecting portion 6612 extending from the operating portion 6611 into the inner receiving space 67 via the operating hole 6122 in the front wall 6121 of the second frame member 612. The abutting block 662 is disposed in the inner receiving space 67, is coupled to the connecting portion 6612, and abuts against one of the positioning blocks 651. The operating member 661 is operable so as to drive the abutting block 662 for moving the positioning blocks 651 from the first position to the second position.

In this embodiment, the pivot shaft 621 has a C-shaped cross-section. The hinge device 6 further includes a mounting unit 63. The mounting unit 63 has a fixing end portion 631 adapted to be mounted in the main computer housing 4 (see FIG. 5), and a pivot end portion 632 opposite to the fixing end portion 631 and coupled pivotally to the second end portion 614 of the elongated main frame 61. The pivot end portion 632 has a C-shaped cross-section such that the pivot end portion 632 cooperates with the second end portion 614 of the elongated main frame 61 to confine an access hole that is communicated with the inner receiving space 67. As such, a cable (not shown) for interconnecting electrically the main computer housing 4 and the display panel 5 can be received in the inner receiving space 67 via the access hole and the pivot shaft 621.

Figure 7:
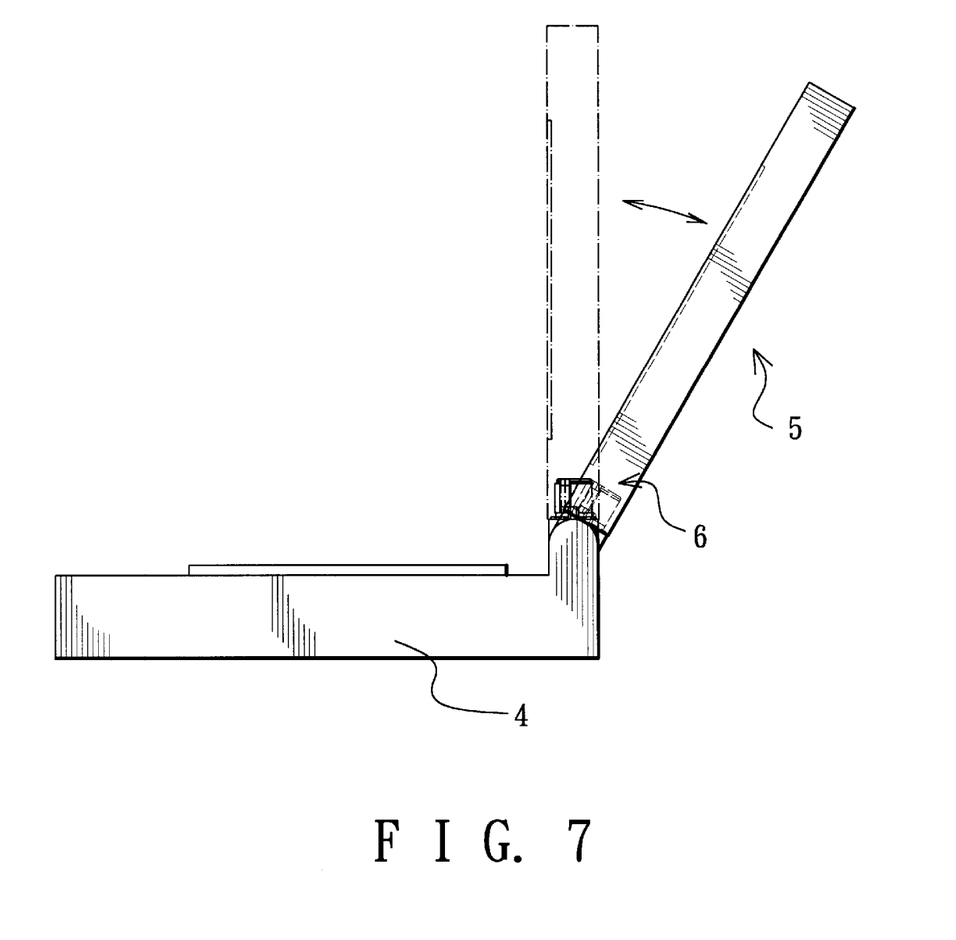
FIG. 7 is a schematic side view showing how a display panel of the notebook computer assembled with the preferred embodiment pivots axially about a first axis.
Figure 8:
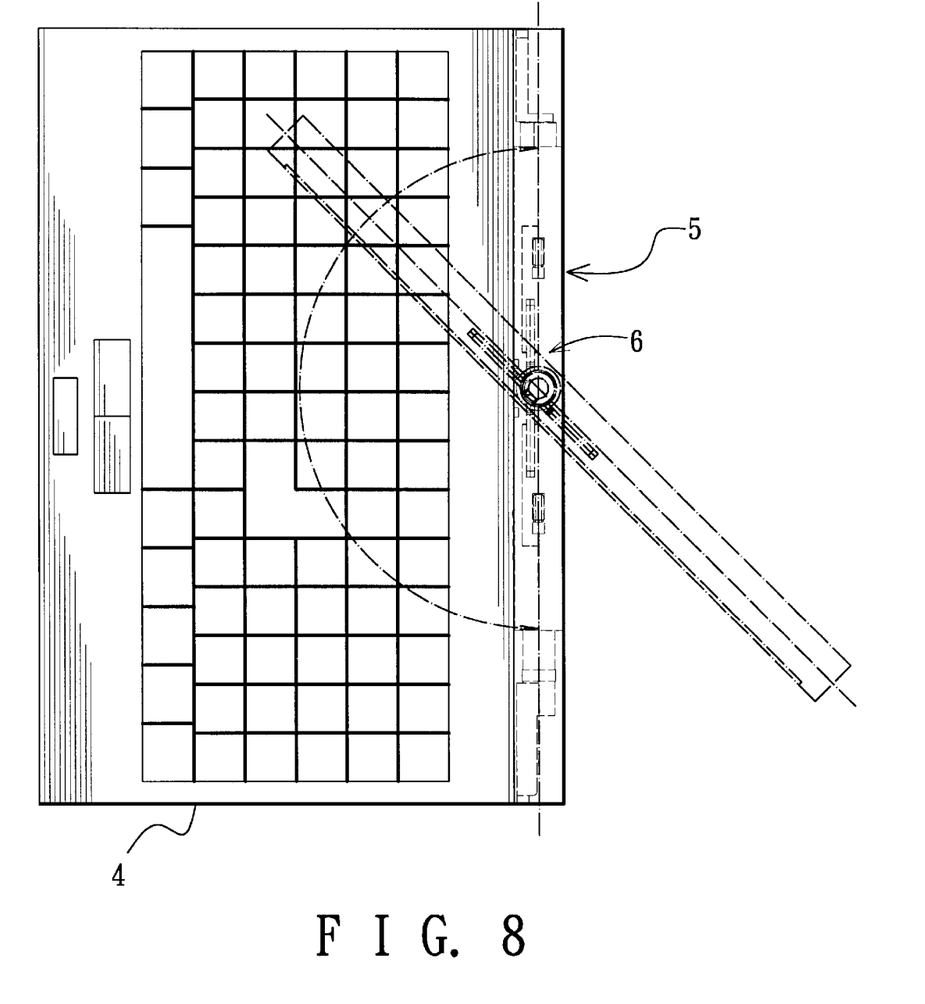
FIG. 8 is a schematic top view showing how the display panel pivots axially about a second axis.
Figure 9:
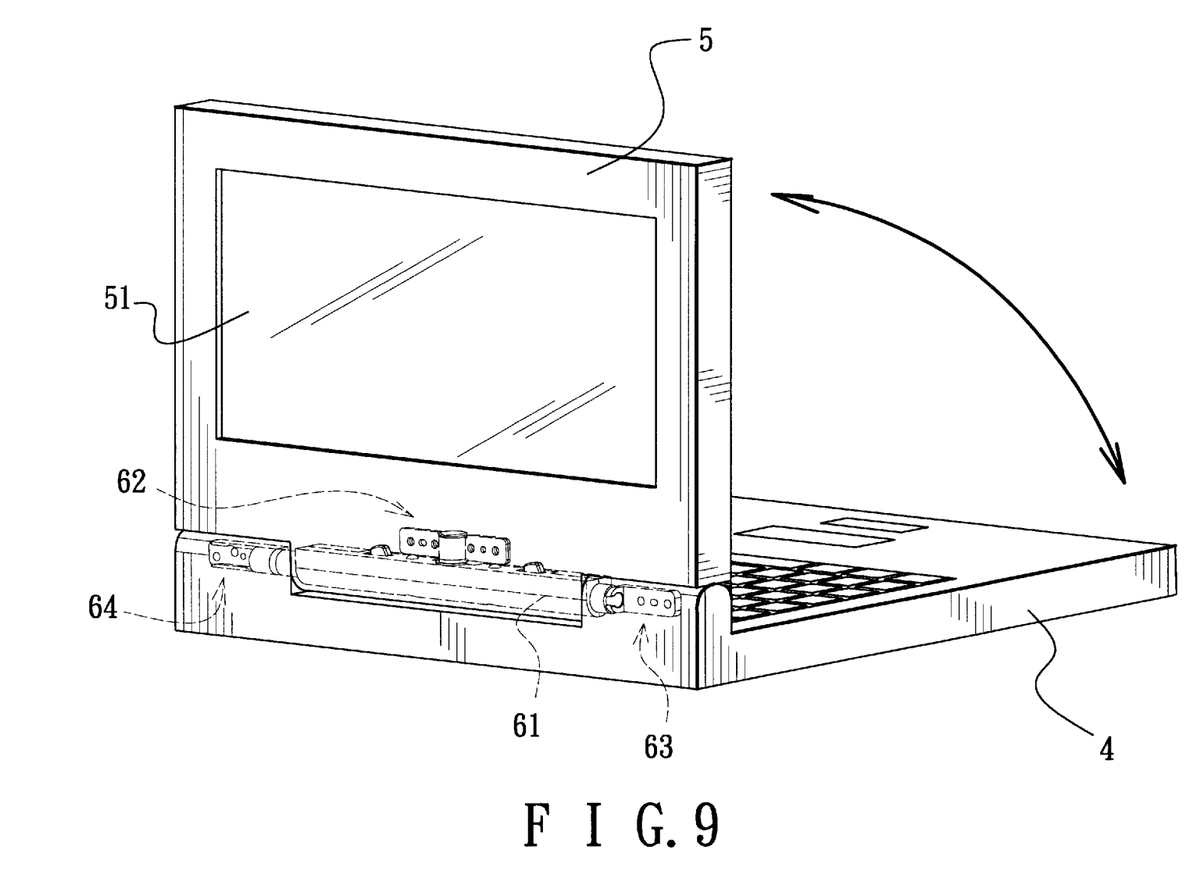
FIG. 9 is a rear perspective view showing the notebook computer assembled with the preferred embodiment in a state of use.

Therefore, when the positioning blocks 651 are disposed at the first position, the display panel 5 is adapted to be co-rotatable with the pivot rod 642 relative to the stationary fixing block 641 (the main computer housing 4) about the first axis (A), as shown in FIG. 7. When the positioning blocks 651 are disposed at the second position, the display panel 5 is adapted to be co-rotatable with the pivot member 620 relative to the elongated main frame 61 (the main computer housing 4) about the second axis (B), as shown in FIG. 8. Furthermore, when the display panel 5 serves as a tablet device, by rotating the display panel 5, as shown in FIG. 9, a display surface 51 of the display panel 5 can face upward so as to facilitate operation thereof.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A hinge device, comprising:

an elongated main frame extending along a first axis, and having a first end portion and a second end portion opposite to said first end portion along said first axis;

a hinge unit including a stationary fixing block, and an elongated pivot rod that extends along said first axis and that has a pivot end portion coupled pivotally to said stationary fixing block such that said pivot rod is rotatable axially about said first axis, and a connecting end portion connected to said first end portion of said elongated main frame such that said elongated main frame is co-rotatable with said pivot rod relative to said stationary fixing block;

a pivot unit including an elongated pivot shaft that extends along a second axis transverse to said first axis, said pivot shaft having a lower end portion coupled to said elongated main frame, and an upper end portion opposite to said lower end portion and projecting from said elongated main frame, said pivot unit further having a pivot member coupled pivotally to said upper end portion of said pivot shaft such that said pivot member is capable of rotating axially relative to said elongated main frame about said second axis;

a positioning unit mounted on said elongated main frame and operable so as to prevent axial rotation of said pivot member about said second axis;

said elongated main frame includes a first frame member and a second frame member that cooperates with said first frame member to confine an inner receiving space that extends along said first axis; and said first frame member has a top wall formed with a first recess, said second frame member having a top wall formed with a second recess, said first recess cooperating with said second recess so as to confine a shaft-receiving hole that permits said lower end portion of said pivot shaft to extend into said inner receiving space.

2. The hinge device as claimed in claim 1, wherein said pivot shaft has a C-shaped cross-section.

3. The hinge device as claimed in claim 2, further comprising a mounting unit coupled pivotally to said second end portion of said elongated main frame and cooperating with said second end portion of said elongated main frame to confine an access hole that is communicated with said inner receiving space.

4. A hinge device, comprising:

an elongated main frame extending along a first axis, and having a first end portion and a second end portion opposite to said first end portion along said first axis;

a hinge unit including a stationary fixing block, and an elongated pivot rod that extends along said first axis and that has a pivot end portion coupled pivotally to said stationary fixing block such that said pivot rod is rotatable axially about said first axis, and a connecting end portion connected to said first end portion of said elongated main frame such that said elongated main frame is co-rotatable with said pivot rod relative to said stationary fixing block;

a pivot unit including an elongated pivot shaft that extends along a second axis transverse to said first axis, said pivot shaft having a lower end portion coupled to said elongated main frame, and an upper end portion opposite to said lower end portion and projecting from said elongated main frame, said pivot unit further having a pivot member coupled pivotally to said upper end portion of said pivot shaft such that said pivot member is capable of rotating axially relative to said elongated main frame about said second axis;

a positioning unit mounted on said elongated main frame and operable so as to prevent axial rotation of said pivot member about said second axis;

said elongated main frame includes a first frame member and a second frame member that cooperates with said first frame member to confine an inner receiving space that extends along said first axis; and wherein one of said first and second frame members has a top wall formed with a pair of positioning holes, said positioning unit including a pair of positioning blocks, each of which is disposed in said inner receiving space, is registered with a respective one of said positioning holes, and is rotatable about a respective third axis transverse to said first and second axes, said positioning blocks being rotatable between a first position, wherein said positioning blocks project upwardly from said top wall via said positioning holes, and a second position, wherein said positioning blocks are fully concealed within said inner receiving space, and a connecting rod interconnecting said positioning blocks to ensure simultaneous rotation of said positioning blocks.

5. The hinge device as claimed in claim 4, further comprising a biasing unit for biasing said positioning blocks to said first position.

6. The hinge device as claimed in claim 5, further comprising an operating unit mounted on said second frame member and operable so as to move said positioning blocks from said first position to said second position.

7. The hinge device as claimed in claim 6, wherein said second frame member has a front wall formed with an operating hole, said operating unit including an operating member having an operating portion mounted movably on said front wall of said second frame member, and a connecting portion extending from said operating portion into said inner receiving space via said operating hole, and an abutting block disposed in said inner receiving space, coupled to said connecting portion, and abutting against one of said positioning blocks, said operating member being operable so as to drive said abutting block for moving said positioning blocks from said first position to said second position.

8. The hinge device as claimed in claim 4, wherein said top wall is further formed with a ball hole, said positioning unit further including a resilient plate mounted in said inner receiving space below said top wall, and formed with a recess that is aligned with said ball hole, and a positioning ball disposed in said recess between said top wall and said resilient plate, said positioning ball protruding outwardly of said inner receiving space via said ball hole in said top wall.

* * * * *